United States Patent [19]

Grossi et al.

[11] 4,383,081

[45] May 10, 1983

[54] CATIONIC ACRYLAMIDE CHEMICALLY MODIFIED ASPHALTS

[75] Inventors: Anthony V. Grossi, Newark; Leon A. Hagelee, Minerva Park; Louis T. Hahn; Alfred Marzocchi, both of Newark, all of Ohio

[73] Assignee: Owens-Corning Fiberglas Corporation, Toledo, Ohio

[21] Appl. No.: 329,899

[22] Filed: Dec. 11, 1981

[51] Int. Cl.³ .................... C08F 289/00; C08G 83/00; C08H 5/00
[52] U.S. Cl. .................................... 525/54.5; 527/500
[58] Field of Search ....................... 525/54.5; 527/500; 106/273 N

[56]       References Cited
      U.S. PATENT DOCUMENTS 2,716,616  8/1955  Rendall et al. .
3,096,190  7/1963  De Groote et al. .
3,259,512  7/1966  Dickson et al. .
3,513,005  5/1970  Bradshaw et al. .
3,997,354  12/1976  Pivette et al. .
4,166,752  9/1979  Marzocchi et al. .
4,273,588  6/1981  Marzocchi et al. .
4,273,685  6/1981  Marzocchi et al. .
4,301,051  11/1981  Marzocchi et al. .
4,316,829  2/1982  Roberts .............................. 106/273

FOREIGN PATENT DOCUMENTS 49-52287  5/1974  Japan ................................... 527/500

Primary Examiner—Theodore Morris
Attorney, Agent, or Firm—Ronald C. Hudgens; Robert F. Rywalski

[57]         ABSTRACT

Cationic chemically modified asphalts having utility for road construction, repair and maintenance, as well as a coating for various substrates including cementitious substrates, glass and metal are provided. These asphalts are obtained by reacting an acrylamide, optionally with a vinyl aromatic, with a prereacted product of asphalt, a rubber and a vinyl aromatic monomer.

16 Claims, No Drawings

CATIONIC ACRYLAMIDE CHEMICALLY MODIFIED ASPHALTS

CROSS-REFERENCES

This case is related to U.S. Ser. No. 329,902 filed concurrently herewith.

TECHNICAL FIELD

The present invention relates to asphalt compositions, and more particularly it relates to chemically modified asphalt compositions. Even yet more particularly, the present invention relates to acrylamide modified asphalts.

BACKGROUND, SUMMARY AND INDUSTRIAL EXPLOITATION

Asphalt has been employed for numerous and wide variety of applications for many years. One of the problems encountered with asphalt is that its adhesion to various substrates and especially to aggregate needs to be improved. Such aggregate is represented, for example, by gravel, crushed rock, slag, sand and crushed limestone. Additionally, the adhesion of asphalt needs to be improved with respect to other material such as, for example, cementitious materials, metals, glass and the like.

In accordance with the present invention, improved asphalt compositions are provided which composition is the product produced by reacting an acrylamide with asphalt that has been prereacted with a vinyl aromatic monomer and a rubbery polymer, the reacting optionally being done in the presence of a vinyl aromatic monomer which may be the same as or different than the vinyl aromatic monomer employed in producing the prereacted asphalt. Styrene is preferred in both instances.

Some of the desirable properties of the present compositions include improved coatability of negatively charged surfaces, improved adhesion, less stripping, improved emulsifiability, improved flexibility, particularly at low temperatures, improved strength, reduced high temperature flow, increased durability, better compatibility with polymers.

These compositions will find utility for a wide variety of purposes. They, for example, will find application in the highway and bridge construction, repair and maintenance areas as, for example, crack and pothole fillers, joint sealers, and water resistant membranes, as well as cut-backs with the compositions being used alone or as blends with conventional asphalts. These compositions can be formed into emulsions with conventional asphalt emulsifiers to form a slow set emulsion, having utility for slurry seal applications, or as a cold overlay. Preferably non-ionic surfactants are used as emulsifiers. The compositions may also be employed as corrosion resistant and/or water resistant coatings for metals and as coatings and/or impregnants for glass, especially glass fibers. Such coated or impregnated glass fibers will show outstanding compatibility with conventional asphalt and consequently will serve as outstanding reinforcements for such asphalts.

DESCRIPTION

The product produced by reacting an acrylamide, and optionally a vinyl aromatic monomer with asphalt that has been prereacted with a vinyl aromatic monomer and a rubbery polymer is done by heating the ingredients at an elevated temperature for several hours. Preferably, the reacting is done by heating at a temperature of at least about 115° C. for about 8 hours, and most desirably, at a temperature of about 120° C. to about 180° C. for about 24 hours. It is believed that because of the double bond unsaturation in the acrylamide that the acrylamide is chemically incorporated into the composition by reaction with double bonds present in the prereacted asphalt. Additionally, the amino groups present in the acrylamides provide for highly desirable polarity which serves to greatly enhance the adhesive bonding of the present compositions to various substrates, including, for example, aggregates commonly employed in road repair and maintenance, as well as cementitious and other substrates. Additionally, it is preferred to also employ an additional vinyl aromatic monomer, preferably styrene, because it is believed that the reactivity of the unsaturated double bond in the vinyl aromatic monomer enhances the rate at which the ingredients are chemically incorporated.

The acrylamides employed in the present invention may desirably be secondary amides or tertiary amides. Preferably, the acrylamide will be a compound of the formula

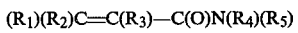

wherein $R_1$, $R_2$ and $R_3$ are independently selected from hydrogen or an alkyl containing 1 to 3 carbon atoms; $R_4$ and $R_5$ are independently selected from hydrogen, an alkyl containing 1 to 3 carbon atoms, or, preferably, a radical of the formula

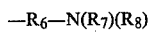

wherein $R_7$ and $R_8$ are independently selected from hydrogen or an alkyl having 1 to 3 carbon atoms, and $R_6$ is an alkylene group containing 1 to 5 carbon atoms. The preferred acrylamide is dimethylaminopropylmethacrylamide, that is a compound of the formula

Representative acrylamides include
N,N-dimethylaminopropylmethacrylamide,
N,N-dimethylaminoisopropylmethacrylamide,
N,N-dimethylaminoethylmethacrylamide,
N-methylaminopropylmethacrylamide,
N-methylaminoisopropylmethacrylamide,
N-methylaminoethylmethacrylamide, aminopropylmethacrylamide, aminoisopropylmethacrylamide, aminoethylmethacrylamide,
N,N-diethylaminopropylmethacrylamide,
N,N-diethylaminoisopropylmethacrylamide,
N,N-diethylaminoethylmethacrylamide,
N-ethylaminopropylmethacrylamide,
N-ethylaminoisopropylmethacrylamide,
N-ethylaminoethylmethacrylamide,
N-ethyl,N-methylaminopropylmethacrylamide,
N-ethyl,N-methylaminoisopropylmethacrylamide,
N-ethyl,N-methylaminoethylmethacrylamide,
N,N-dimethylaminopropylacrylamide,
N,N-dimethylaminoisopropylacrylamide,
N,N-dimethylaminoethylacrylamide,
N-methylaminopropylacrylamide,
N-methylaminoisopropylacrylamide, N-methylaminoethylacrylamide, aminopropylacrylamide, aminoisopropylacrylamide, aminoethylacrylamide,
N,N-diethylaminopropylacrylamide,
N,N-diethylaminoisopropylacrylamide,
N,N-diethylaminoethylacrylamide,
N-ethylaminopropylacrylamide,
N-ethylaminoisopropylacrylamide,
N-ethylaminoethylacrylamide,
N-ethyl,N-methylaminopropylacrylamide,
N-ethyl,N-methylaminoisopropylacrylamide,
N-ethyl,N-methylaminoethylacrylamide.

The prereacted asphalt composition which is employed in the present invention is a chemically modified asphalt which is not novel per se and which is well known in the art. These chemically modified asphalts essentially comprise the reaction product of asphalt, a vinyl aromatic monomer, and a rubbery polymer. The chemically modified asphalt is obtained by reacting the constituents for a time, preferably about 20 hours, and at a temperature, preferably about 170° C., sufficient for the vinyl aromatic monomer and rubbery polymer to react with the asphalt. Typically, the vinyl aromatic monomer is employed in an amount corresponding to about 0.5 to about 35% by weight of the asphalt, and the rubbery polymer is used in an amount ranging from about 0.5 to about 30% by weight based on the weight of asphalt.

Asphalt materials which are suitable for these purposes preferably include those which are typically used for road paving, repair and maintenance purposes. Thus, asphalt includes natural asphalt, petroleum asphalt and petroleum tar. The natural asphalts include, for example, asphaltite, such as Gilsonite, grahamite and glancepitch, lake asphalt, such as Trinidad asphalt, and rock asphalt. The petroleum asphalt that may be used includes straight asphalt obtained by distillation of a crude oil, blown asphalt, produced by blowing an oxygen-containing gas into straight asphalt, and solvent extracted asphalt. The petroleum tar that may be used includes coal tar and oil gas tar. Tar pitch is equally suitable. Additionally, the asphalts can be those that have been blown with steam, ammonia, or amines of the type set forth in U.S. Pat. No. 4,166,752. Preferably, the asphalt which will be employed is an asphalt cement of the type typically used for road paving, repair and maintenance purposes, such as for example, the AC-5, AC-10, AC-20 grades. Such asphalts typically have penetrations ranging between about 20 to about 200.

As the polymerizable vinyl monomer, for forming the prereacted asphalt or as the optional vinyl aromatic monomer, use is preferably made of a monofunctional vinyl aromatic monomer having a general formula:

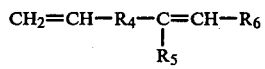

wherein $R_1$ is an aromatic group containing 6 to 12 carbon atoms, including a phenyl group, a substituted phenyl group wherein the substituent is any one of an amino group, a cyano group, a halogen group, a $C_1$ to $C_3$ alkoxy group, a $C_1$ to $C_3$ alkyl group, a hydroxy group, a nitro group, etc. $R_2$ is preferably hydrogen or lower alkyl e.g., a $C_1$ to $C_5$ alkyl and $R_3$ is hydrogen, lower alkyl or one of the following groups:

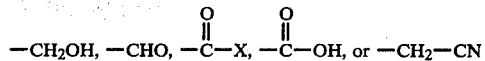

wherein X is halogen, and preferably chlorine or bromine. Styrene is preferred. In conjunction with the vinyl aromatic monomer as described above, a polyfunctional vinyl aromatic monomer containing 6 to 12 carbon atoms in the aromatic ring and two or more polymerizable vinyl groups chemically bonded to the aromatic ring can be employed. Preferred polyfunctional monomers are those having the general formula:

$$CH_2=CH-R_4-\underset{R_5}{\overset{}{C}}=CH-R_6$$

wherein $R_4$ is a divalent aromatic group containing 6 to 12 carbon atoms, and preferably a phenylene group; and, $R_5$ and $R_6$ have the same meaning as is described above with respect to $R_2$ and $R_3$, respectively for the monofunctional vinyl aromatic monomer. Illustrative of a suitable polyfunctional vinyl aromatic monomer is divinyl benzene. When use is made of a polyfunctional vinyl aromatic monomer in combination with a monofunctional vinyl aromatic monomer such as styrene, generally the monofunctional vinyl aromatic is present in a weight ratio of about 1:1 to 40:1 based on the weight of the polyfunctional vinyl aromatic monomer.

As the rubbery polymer, use can be made of a number of vulcanizable elastomeric materials well known to those skilled in the art. Included are natural rubbers as well as synthetic rubbers. Suitable are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Substituted butadienes are commercially available from, for example, Atlantic-Richfield under the trademark "Poly B-D", a series of hydroxy-terminated butadiene polymers; for example, use can be made of hydroxy-terminated butadiene homopolymers like Poly B-D R-15M which has a hydroxy number of 42 or Poly B-D R-45M.

Preferably, the rubber polymer is an elastomeric material formed by copolymerization of one or more of the conjugated dienes with one or more ethylenic monomers, such as styrene as well as hydroxy, amino and mercapto-substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers like Poly B-D CN-15 having a hydroxyl number of 39. Preferred are butadiene-styrene rubbers like SOLPRENE 1205C available from Phillips Petroleum.

An especially suitable chemically modified asphalt which is the reaction product of asphalt, a vinyl aromatic monomer, and a rubbery polymer is that available commercially from Owens-Corning Fiberglas Corporation under their ROADBOND trademark.

The proportion of ingredients employed vary over wide ranges. Generally, however, it is preferred to use the acrylamide in an amount of about 0.5% to about 15%, and most desirably in an amount of about 1% to about 5% based on the amount of prereacted asphalt employed. As indicated above, a vinyl aromatic monomer is optionally also present and preferably will be present. Such vinyl aromatic monomer may be the same as that previously described, or it may be different. When employed, it is desirable to employ such vinyl aromatic monomer in an amount of about 0.5% to about 15%, and more desirably about 1% to about 10% based on the amount of the prereacted asphalt which is employed.

While the above describes the invention with sufficient particularlity to allow those skilled in the art to make the use same, nonetheless further examplification follows.

EXAMPLE

Into a reactor provided with an agitator and a reflux condenser there is charged asphalt which had been prereacted with a vinyl aromatic monomer and a rubbery polymer (the material commercially available from Owens-Corning Fiberglas Corporation under their trade designation ROADBOND). This chemically modified asphalt was then heated to about 110° C. at which time styrene was charged into the reactor and then the ingredients heated to about 150° C. with dimethylaminopropylmethacrylamide then being charged into the reactor. The total charge was about 94% by weight of the prereacted, or chemically modified, asphalt, about 5% by weight of the acrylamide and about 1% by weight of styrene. The ingredients were heated at about 150° C. with agitation under reflux conditions for about 24 hours. The material after cooling is suitable for any of the numerous utilities previously set forth.

While the above describes the present invention, it will, of course, be apparent that modifications are possbile which pursuant to the patent statutes and laws do not depart from the spirit and scope hereof.

We claim:

1. As a composition of matter, the product produced by reacting an (i) acrylamide with (ii) asphalt that has been prereacted with a vinyl aromatic monomer and a rubbery polymer and (iii) optionally, a vinyl aromatic monomer.

2. The composition of claim 1 wherein said acrylamide is a compound of the formula

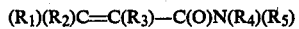

wherein $R_1$, $R_2$ and $R_3$ are independently selected from hydrogen and a $C_1$–$C_3$ alkyl; $R_4$ and $R_5$ are idependently selected from hydrogen, a $C_1$–$C_3$ alkyl and a radical of the formula

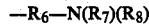

wherein $R_6$ is an alkylene group of 1 to 5 carbon atoms and $R_7$ and $R_8$ are independently selected from hydrogen or a $C_1$–$C_3$ alkyl.

3. The composition of claim 2 wherein $R_4$ and $R_5$ are said radical of the formula —$R_6$—N($R_7$)($R_8$).

4. The composition of claim 3 wherein $R_1$ and $R_2$ are hydrogen.

5. The composition of claim 3 wherein $R_6$ is ethylene or propylene.

6. The composition of claim 3 wherein $R_3$, $R_7$ and $R_8$ are hydrogen or methyl.

7. The composition of claim 2 wherein said acrylamide is dimethylaminopropylmethacrylamide.

8. The composition of claim 3 wherein said rubbery polymer is a homopolymer of a diene or a copolymer of a diene and an olefinically unsaturated monomer.

9. The composition of claim 8 wherein said reacting is done by heating at a temperature of at least about 115° C. for at least about 8 hours.

10. The composition of claim 9 wherein said optional vinyl aromatic is employed to produce said composition.

11. The composition of claim 10 wherein said employed optional vinyl aromatic is styrene and wherein the vinyl aromatic of said prereacted asphalt is styrene.

12. A process for producing a chemically modified asphalt which comprises charging into a reactor (i) an acrylamide, (ii) an asphalt that has been prereacted with a vinyl aromatic monomer and a rubbery polymer and, (iii) optionally, a vinyl aromatic monomer, and heating the materials in the reactor at an elevated temperature for several hours.

13. The process of claim 12 whereiin said acrylamide is a compound of the formula

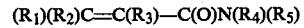

wherein $R_1$, $R_2$ and $R_3$ are independently selected from hydrogen and a $C_1$–$C_3$ alkyl; $R_4$ and $R_5$ are independently selected from hydrogen, a $C_1$–$C_3$ alkyl and a radical of the formula

wherein $R_6$ is an alkylene group of 1 to 5 carbon atoms and $R_7$ and $R_8$ are independently selected from hydrogen or a $C_1$–$C_3$ alkyl.

14. The process of claim 13 wherein the materials are heated at a temperature of at least about 115° C. for at least about 8 hours.

15. The process of claim 14 wherein said vinyl aromatic monomer is styrene and wherein said rubbery polymer is a homopolymer of a diene or a copolymer of a diene and an olefinically unsaturated monomer.

16. The composition of claim 2 wherein said reacting is done by heating at an elevated temperature for several hours.

* * * * *